United States Patent
Lio et al.

(10) Patent No.: US 9,003,981 B2
(45) Date of Patent: Apr. 14, 2015

(54) FURNITURE CONNECTOR AND FURNITURE USING SAME

(71) Applicant: Teknion Limited, Toronto (CA)

(72) Inventors: Stefano Lio, Toronto (CA); Jehan Paul-Chowdhury, Toronto (CA); Nicholas Gillissie, Toronto (CA)

(73) Assignee: Teknion Limited, Toronto (CA)

( * ) Notice: Subject to any disclaimer, the term of this patent is extended or adjusted under 35 U.S.C. 154(b) by 31 days.

(21) Appl. No.: 13/903,106

(22) Filed: May 28, 2013

(65) Prior Publication Data

US 2013/0319296 A1    Dec. 5, 2013

Related U.S. Application Data

(60) Provisional application No. 61/654,205, filed on Jun. 1, 2012.

(51) Int. Cl.
| | |
|---|---|
| *A47B 13/02* | (2006.01) |
| *F16B 12/44* | (2006.01) |
| *A47B 13/00* | (2006.01) |
| *A47B 3/06* | (2006.01) |
| *F16B 12/40* | (2006.01) |
| *F16B 12/42* | (2006.01) |

(52) U.S. Cl.
CPC ............... *F16B 12/44* (2013.01); *A47B 13/00* (2013.01); *A47B 3/06* (2013.01); *F16B 12/40* (2013.01); *F16B 12/42* (2013.01); *A47B 2013/006* (2013.01)

(58) Field of Classification Search
CPC ........ A47B 13/02; A47B 13/00; A47B 13/06; E04B 1/2604; E04B 2001/2644; F16B 12/40; F16B 12/44

USPC ......... 52/854, 665, 655.1; 403/174, 175, 178, 403/218, 205, 403, 186, 187, 230, 231; 108/153.1, 155, 157.1, 157.17, 108/158.11–158.13; 248/188
See application file for complete search history.

(56) References Cited

U.S. PATENT DOCUMENTS

| | | | | |
|---|---|---|---|---|
| 1,441,559 | A * | 1/1923 | Burhen | 403/205 |
| 2,185,948 | A * | 1/1940 | Pimm | 182/87 |
| 2,365,501 | A * | 12/1944 | Walstrom | 403/174 |
| 3,082,712 | A * | 3/1963 | Johnson et al. | 108/158.11 |
| 3,860,351 | A * | 1/1975 | Weiss et al. | 403/218 |
| 4,049,331 | A * | 9/1977 | Gutmann, Jr. | 312/203 |
| 4,702,638 | A * | 10/1987 | Zalesak | 403/403 |
| 4,754,711 | A * | 7/1988 | Solomon | 108/8 |
| 5,403,110 | A * | 4/1995 | Sammann | 403/234 |
| 5,488,810 | A * | 2/1996 | Horton | 52/715 |

(Continued)

*Primary Examiner* — Janet M Wilkens
(74) *Attorney, Agent, or Firm* — Bereskin & Parr LLP/S.E.N.C.R.L., s.r.l.

(57) ABSTRACT

A furniture connector includes a pair of connector blocks disposed in opposing relation. Each of the connector blocks includes: a first end which cooperate to removably secure an end of a longitudinal frame member between the pair of connector blocks; and a second end having a first flange and a second flange extending longitudinally. When the pair of connector blocks are secured to the end of the longitudinal frame member, the first flange of each connector block cooperate to define a proximal transverse channel where a first transverse frame member may be removably secured to the pair of connector blocks. The second flange of each connector block cooperate to define a distal transverse channel where a second transverse frame member may be removably secured to the pair of connector blocks.

20 Claims, 9 Drawing Sheets

(56) References Cited

U.S. PATENT DOCUMENTS

| | | | |
|---|---|---|---|
| 5,598,790 A * | 2/1997 | Fich | 108/158.11 |
| 5,624,160 A * | 4/1997 | Koch et al. | 297/452.2 |
| 6,872,027 B2 * | 3/2005 | Ledingham | 403/400 |
| 7,398,621 B2 * | 7/2008 | Banta | 52/93.1 |
| 8,347,796 B2 * | 1/2013 | Udagawa et al. | 108/155 |
| 2009/0190996 A1 * | 7/2009 | Clarke | 403/188 |

* cited by examiner

FURNITURE CONNECTOR AND FURNITURE USING SAME

FIELD

Embodiments disclosed herein relate generally to a furniture connector and to furniture with parts connected using the connector.

INTRODUCTION

Modular and customizable furniture pieces, such as desks and other work surfaces, are commercially desirable for certain applications and often utilize connectors which facilitate easy assembly and disassembly.

SUMMARY

According to a first exemplary aspect, a furniture connector for removably securing a longitudinal frame member to one of a first transverse frame member having a first cross section and a second transverse frame member having a second cross section is provided. The connector comprises:
  a pair of connector blocks adapted to be disposed in opposing relation, wherein each of the connector blocks comprises:
    a first end, wherein the first end of each connector block cooperate to removably secure an end of the longitudinal frame member between the pair of connector blocks; and
    a second end, the second end comprising a first flange and a second flange extending longitudinally;
  wherein, when the pair of connector blocks are secured to the end of the longitudinal frame member:
    the first flange of each connector block cooperate to define a proximal transverse channel adapted to removably secure the first transverse frame member to the pair of connector blocks, and
    the second flange of each connector block cooperate to define a distal transverse channel adapted to removably secure the second transverse frame member to the pair of connector blocks.

According to a second exemplary aspect, a furniture piece is provided. The furniture piece comprises:
a worksurface;
a support frame adapted to support the worksurface, the support frame comprising
  a longitudinal frame member;
  one of a first transverse frame member having a first cross section and a second transverse frame member having a second cross section;
  a pair of connector blocks adapted to be disposed in opposing relation, wherein each of the connector blocks comprises:
    a first end, wherein the first end of each connector block cooperate to removably secure an end of the longitudinal frame member between the pair of connector blocks; and
    a second end, the second end comprising a first flange and a second flange extending longitudinally;
  wherein, when the pair of connector blocks are secured to the end of the longitudinal frame member:
    the first flange of each connector block cooperate to define a proximal transverse channel adapted to removably secure the first transverse frame member to the pair of connector blocks,
    the second flange of each connector block cooperate to define a distal transverse channel adapted to removably secure the second transverse frame member to the pair of connector blocks; and
  an outer face of one of the pair of connector blocks is adapted to abut against an underside of the worksurface to support the worksurface thereon.

According to a third exemplary aspect, a table for resting on a floor surface is provided. The table comprises:
a worksurface;
a support frame adapted to support the worksurface;
a plurality of legs adapted to stand on the floor surface and to support the support frame;
wherein the support frame comprises:
  a longitudinal frame member;
  one of a first transverse frame member having a first cross section and a second transverse frame member having a second cross section;
  a pair of connector blocks adapted to be disposed in opposing relation, wherein each of the connector blocks comprises:
    a first end, wherein the first end of each connector block cooperate to removably secure an end of the longitudinal frame member between the pair of connector blocks; and
    a second end, the second end comprising a first flange and a second flange extending longitudinally;
  wherein, when the pair of connector blocks are secured to the end of the longitudinal frame member:
    the first flange of each connector block cooperate to define a proximal transverse channel adapted to removably secure a first transverse frame member having a first cross section to the pair of connector blocks,
    the second flange of each connector block cooperate to define a distal transverse channel adapted to removably secure the second transverse frame member to the pair of connector blocks; and
  an outer face of one of the pair of connector blocks is adapted to abut against an underside of the worksurface to support the worksurface thereon.

DRAWINGS

For a better understanding of embodiments of the systems and methods described herein, and to show more clearly how they may be carried into effect, reference will be made, by way of example, to the accompanying drawings in which.

DESCRIPTION OF VARIOUS EMBODIMENTS

Various apparatuses or processes will be described below to provide an example of each claimed invention. No example described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention.

Figure 1:
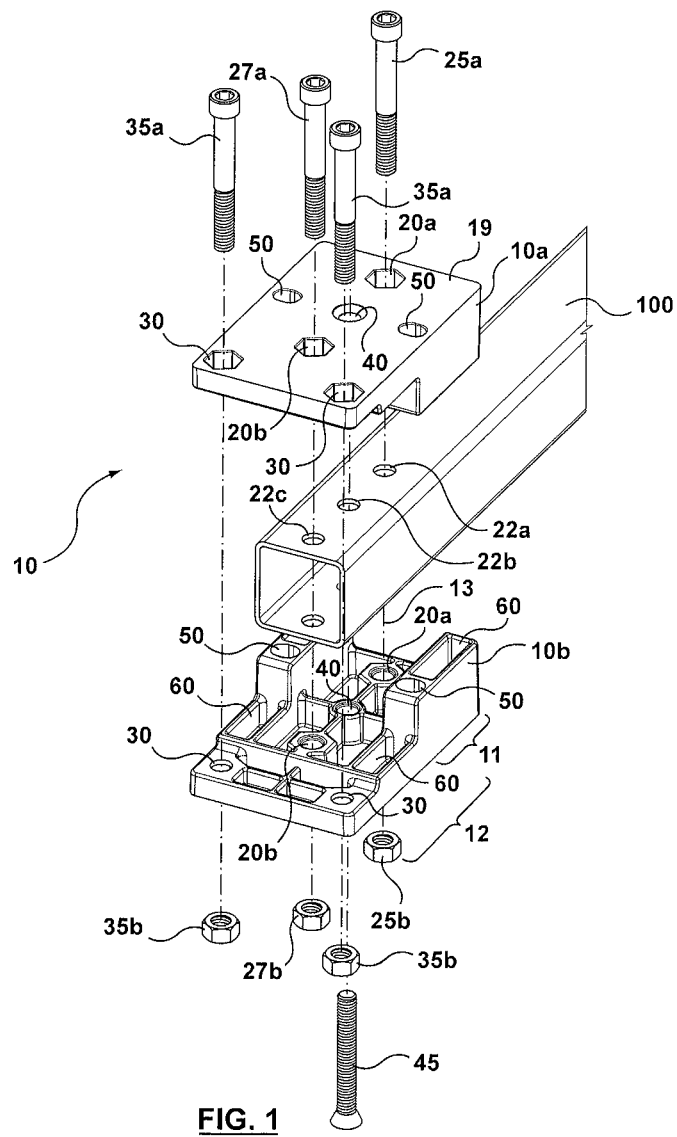
FIG. 1 is an exploded perspective view showing a furniture connector according to an embodiment of the present invention.

Referring first to FIG. 1, a furniture connector 10 includes a pair of preferably identical connector blocks 10a, 10b which may be secured to a longitudinal frame member 100. Each connector block 10a, 10b has a first end 11 with a recess 13 shaped and sized to receive an end of the longitudinal frame member 100. Each connector block also has a longitudinal frame connector bore 20a and a worksurface bore 40 extending through the first end 11. A longitudinal frame connector bore 20b extends through the second end 12. The longitudinal frame connector bores 20a-b and the worksurface bore 40 are located to align with corresponding frame member bores 22a-c in the longitudinal frame member 100, such that when the pair of connector blocks 10a, 10b are disposed in opposing relation about the end of the longitudinal frame member 100, preferably two of the three bores 20a, 20b, and 40 are aligned with two of the three corresponding frame member bores 22a-c. Although two longitudinal frame connector bores 20a, 20b, one worksurface bore 40, and three corresponding frame member bores 22a-c are illustrated and preferred, those skilled in the art will understand that any suitable number of bores may be provided.

In some embodiments, longitudinal frame connectors 25 and 27 are also provided. Each frame connector 25, 27 is preferably made up of a longitudinal frame connector bolt 25a, 27a and a longitudinal frame connector nut 25b, 27b. Preferably, the longitudinal frame connector bolts 25a, 27a are socket cap bolts and the longitudinal frame connector nuts 25b, 27b are hexagonal nuts. In some embodiments, longitudinal frame connectors 25 and 27 may be used interchangeably when securing the furniture connector to the frame members.

Figure 3A:
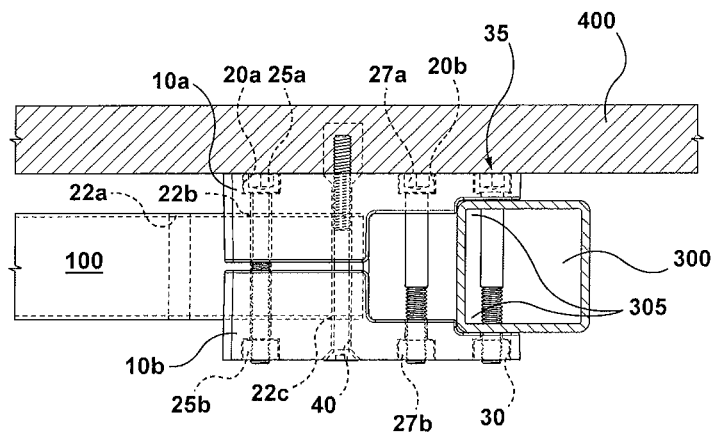
FIG. 3A is a side view showing the furniture connector of FIG. 1 secured to a longitudinal frame member (in a lengthened position) and a second transverse frame member, and positioned below a worksurface.
Figure 3B:
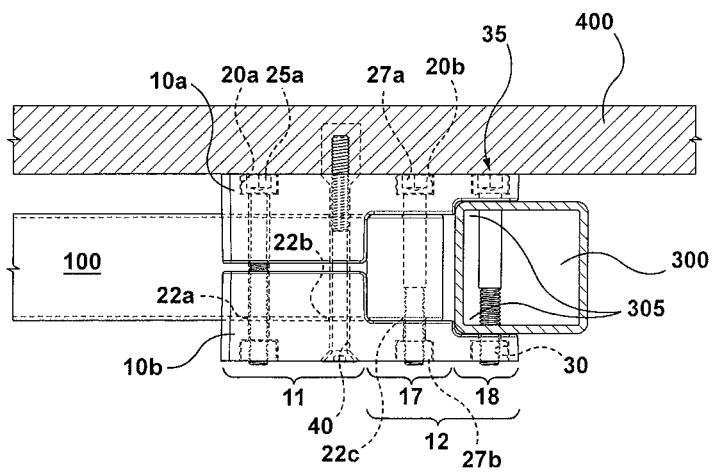
FIG. 3B is a side view showing the furniture connector of FIG. 1 secured to a longitudinal frame member (in a shortened position) and a second transverse frame member, and positioned below a worksurface.
Figure 4A:
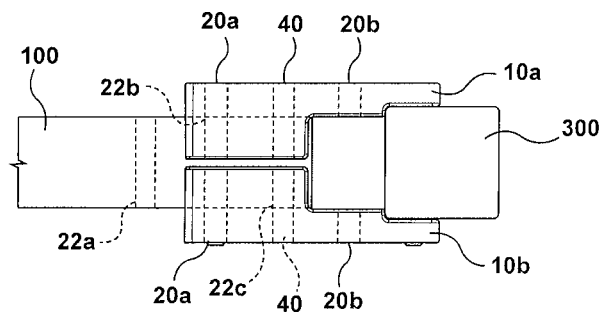
FIG. 4A is a side view showing the furniture connector of FIG. 1 secured to a longitudinal frame member and the second transverse frame member.
Figure 4B:
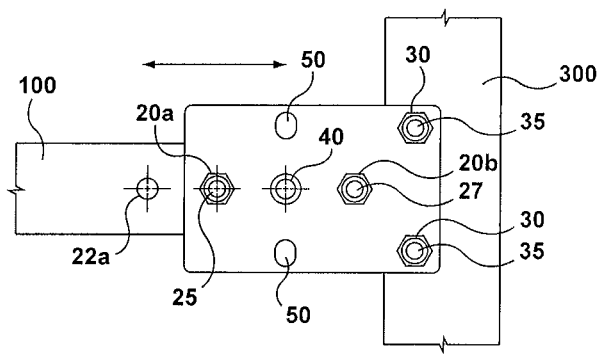
FIG. 4B is a plan view showing the furniture connector of FIG. 1 secured to a longitudinal frame member and the second transverse frame member.
Figure 4C:
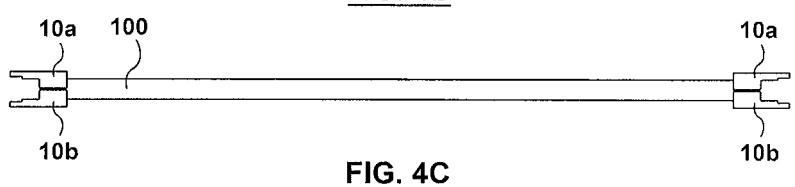
FIG. 4C is a side view showing the furniture connector of FIG. 1 secured to a longitudinal frame member in a shortened position.
Figure 4D:
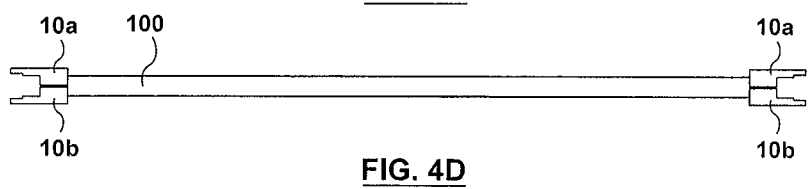
FIG. 4D is a side view showing the furniture connector of FIG. 1 secured to a longitudinal frame member in a lengthened position.

FIGS. 3A-B and 4A-4D show that the pair of connector blocks 10a, 10b can be secured to the longitudinal frame member 100 in at least a shortened position (using corresponding frame member bores 22a and 22c, as shown in FIGS. 3B and 4C) and a lengthened position (using corresponding frame member bore 22b, as shown in FIGS. 3A and 4D).

Figure 2A:
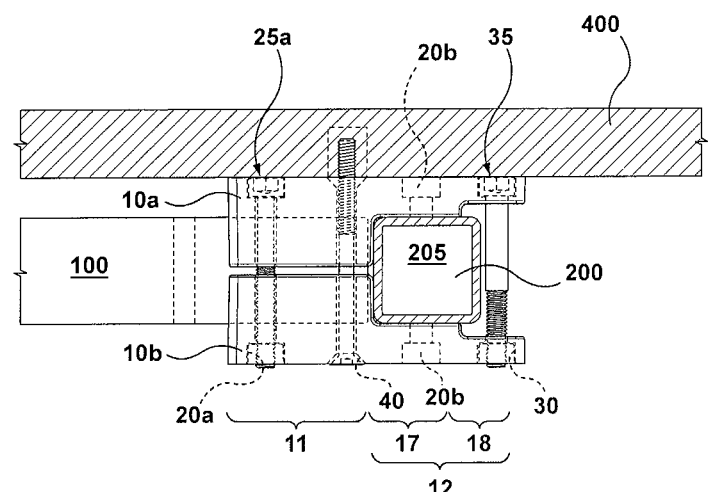
FIG. 2A is a side view showing the furniture connector of FIG. 1 secured to a longitudinal frame member and a first transverse frame member, and positioned below a worksurface.

Referring to FIG. 3A, the pair of connector blocks 10a, 10b are secured to the longitudinal frame member 100 in a lengthened position, with longitudinal frame connector 25 passing through longitudinal frame connector bore 20a and frame member bore 22b, and longitudinal frame connector 27 passing through longitudinal frame connector bore 20b. Referring now to FIG. 3B, the pair of connector blocks 10a, 10b are secured to the longitudinal frame member 100 in a shortened position, with longitudinal frame connector 25 passing through longitudinal frame connector bore 20a and frame member bore 22a, and longitudinal frame connector 27 passing through longitudinal frame connector bore 20b and frame member bore 22c. Referring now to FIG. 2A, the pair of connector blocks 10a, 10b are secured to the longitudinal frame member 100, with longitudinal frame connector 25 passing through longitudinal frame connector bore 20a and frame member bore 22b. Longitudinal frame connector 27 is not used in the configuration illustrated in FIG. 2A, and is not required to secure the pair of connector blocks 10a, 10b to the longitudinal frame member 100.

Figure 5:
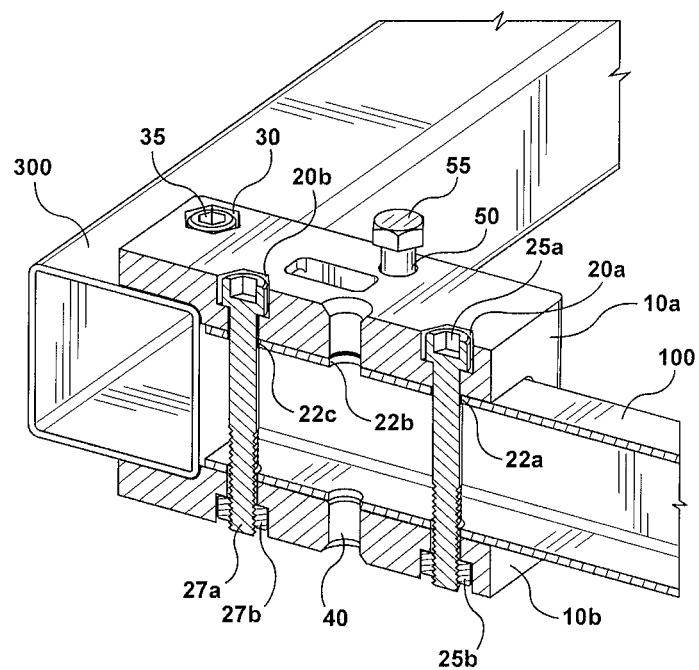
FIG. 5 is a sectional perspective view showing the furniture connector of FIG. 1 secured to a longitudinal frame member and to a second transverse frame member.

As shown in FIGS. 1 and 5, an outer region of each longitudinal frame connector bore 20a, 20b preferably has a hexagonal cross-section with an area slightly larger than the frame connector nut 25b, 27b, so that the frame connector nut 25b, 27b is flush with (or preferably recessed from) the outer surface of the connector block, and so that the outer region of the frame connector bore resists rotational movement of the nut 25b, 27b. Also, the heads of longitudinal frame connector bolts 25a, 27a are preferably sized so that when the connector 10 is secured to the longitudinal frame member 100, the heads sit flush with (or recessed from) the outer surface of the connector block and are able to rotate within the outer region of the frame connector bore. In this way, when the connector blocks 10a, 10b are being secured to the longitudinal frame member 100, a longitudinal frame connector nut 25b, 27b can be inserted in and held by the outer region of a frame connector bore while a longitudinal frame connector bolt 25a, 27a is inserted through the longitudinal frame connector bores 20a, 20b and corresponding frame member bores 22 and secured to the longitudinal frame connector nut 25b, 27b, preferably using a hex key.

Referring to FIGS. 1, 2A, 2B, 3A and 3B, connector blocks 10a, 10b also have a worksurface bore 40 extending through the connector blocks 10a, 10b. Worksurface bore 40 receives a worksurface fastener 45 so that a worksurface 400 can be removably secured against a top surface 19 of connector block 10a. Worksurface fastener 45 is preferably a hex cap screw or a socket cap screw, but may be any type of fastener, including a fastener with a tapered shank (such as a self-tapping screw or a wood screw). In some embodiments, a threaded insert (not shown) may be secured in the worksurface for receiving the worksurface fastener.

When the pair of connector blocks is secured to the longitudinal frame member 100 in the lengthened position shown in FIG. 3A, the worksurface fastener 45 preferably passes through frame member bore 22c, and that when the pair of connector blocks is secured to the longitudinal frame member 100 in the shortened position shown in FIG. 3B, the worksurface fastener preferably passes through frame member bore 22b. While the worksurface fastener 45 preferably passes through the frame member bores 22b or 22c, it will be appreciated that the worksurface fastener 45 is not intended to contribute to securing the furniture connector 10 to the longitudinal frame member. The connector blocks 10a,b are secured to the longitudinal frame member 100 using longitudinal frame connectors 25 and 27 (except where longitudinal frame connector 27 is not required, e.g. as shown in FIG. 2A).

Referring to FIG. 5, connector blocks 10a, 10b also have a pair of accessory bores 50 extending through the connector blocks 10a, 10b. Accessory bores 50 are adapted to each receive an accessory fastener 55 so that an accessory beam (not shown) can be removably secured against the top surface 19 of connector block 10a. Accessory fastener 55 is preferably a nut and bolt, but may be any type of fastener. In some embodiments, a threaded insert (not shown) may be secured in the accessory beam for receiving the accessory fastener.

In some embodiments, an accessory beam may be connected to two or more furniture connectors 10 and disposed above and parallel to one or more longitudinal frame members 100, so that the longitudinal frame member 100 provides additional rigidity to the accessory beam. For example, where the accessory beam is an aluminium extrusion beam that runs down the center of an assembled furniture piece, the additional rigidity provided by the longitudinal frame member 100 through furniture connectors 10 may allow additional structural elements (e.g. divider screens, storage modules) to be secured to and supported by the accessory beam.

Figure 2B:
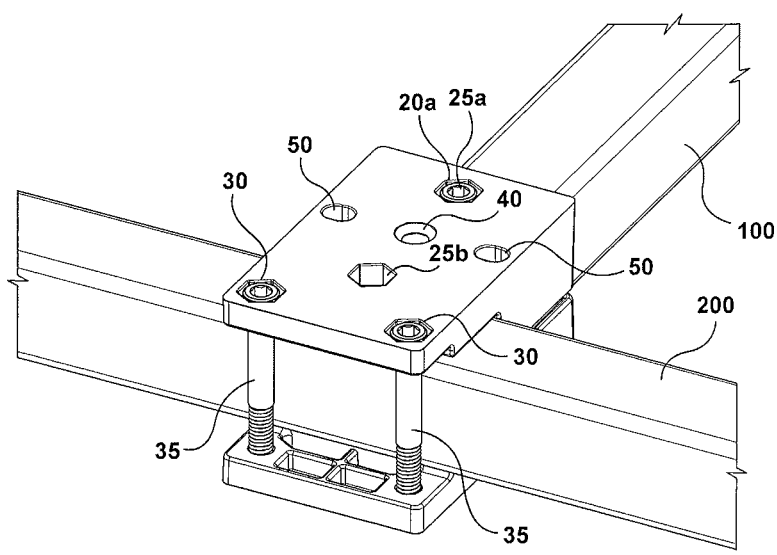
FIG. 2B is a perspective view showing the furniture connector of FIG. 1 secured to a longitudinal frame member and a first transverse frame member.

Returning to FIGS. 2A and 2B, furniture connector 10 may be secured to both the longitudinal frame member 100 and to a first transverse frame member 200. As shown in FIG. 2A, the transverse frame member 200 is received between the second ends 12 in a proximal transverse channel 205 defined by the outer faces of the first ends of the connector blocks 10a, 10b and the inner faces of first flanges 17. The first transverse frame member 200 is preferably secured in the proximal transverse channel by a pair of transverse connectors 35 inserted through a corresponding pair of transverse connector bores 30 locate in each connector block 10a, 10b. As explained above, longitudinal frame connector 27 is not required to secure the pair of connector blocks 10a, 10b to the longitudinal frame member 100 in the configuration shown in FIG. 2A. As shown in FIG. 2B, this allows the furniture connector 10 to be secured anywhere along the length of the first transverse frame member 200, as connector bores in the first transverse frame member 200 are not required.

In this example, longitudinal frame member 100 and first transverse frame member 200 have the same general cross sectional shape (i.e. rectangular, or, more specifically in this example, square) and approximately the same cross sectional area. In alternative embodiments, the cross sectional shape of longitudinal frame member 100 may be different from the cross sectional shape of first transverse frame member 200. As non-exhaustive examples, longitudinal frame member may have a circular, oval, or triangular cross section. Also, the first transverse frame member 200 may have a circular, oval, triangular, or other cross sectional shape.

Transverse frame connectors 35 are preferably made up of a transverse frame connector bolt 35a and a transverse frame connector nut 35b. Preferably, the transverse frame connector bolts 35a are socket cap bolts and the transverse frame connector nuts 35b are hexagonal nuts. In some embodiments, longitudinal frame connectors 25, 27 and transverse frame connectors 35 may be used interchangeably when securing the furniture connector to the frame members.

An outer region of each transverse frame connector bore 30 preferably has a hexagonal cross-section with an area slightly larger than the transverse frame connector nut 35b, so that, when the connector 10 is secured to the transverse frame member 200, the longitudinal frame connector nut 35b may be flush with (or recessed from) the outer surface of the connector block, and so that the outer region of the frame connector bore resists rotational movement of the nut 35b. Also, the heads of transverse frame connector bolts 35a may be sized so that when the connector 10 is secured to the transverse frame member 200, the heads sit flush with (or recessed from) the outer surface of the connector block. The heads of transverse frame connector bolts 35a may also be sized so that the heads can rotate within the outer region of the frame connector bore. In this way, when the connector blocks 10a, 10b are being secured to the first transverse frame member 200, a transverse frame connector nut 35b can be inserted in and held by the outer region of one frame connector bore while a transverse frame connector bolt 35a is inserted through the transverse frame connector bores 30 and secured to the transverse frame connector nut 35b, preferably using a hex key.

Figure 3C:
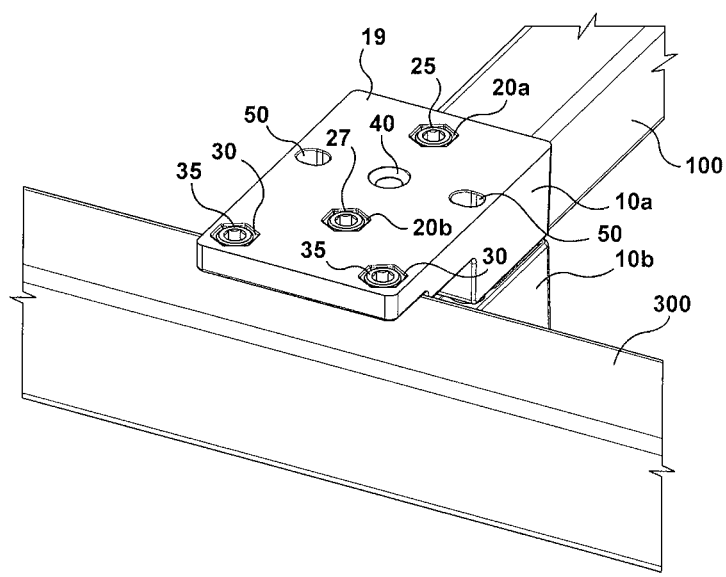
FIG. 3C is a perspective view showing the furniture connector of FIG. 1 secured to a longitudinal frame member and a second transverse frame member.

Turning to FIGS. 3A-3C, furniture connector 10 may be secured to both a longitudinal frame member 100 and to a second transverse frame member 300. As shown in FIGS. 3A-3B, the second transverse frame member 300 is received between the second ends 12 in a distal transverse channel 305 defined by the outer faces of the first flanges 17 of the connector blocks 10a, 10b and the inner faces of second flanges 18. The transverse frame member 300 is secured in the distal transverse channel using transverse connectors 35 inserted through transverse connector bores 30 and corresponding transverse frame member bores 32 (see e.g. FIG. 9).

As shown in FIGS. 2A, 3A, and 3B, when the pair of connector blocks 10a, 10b are secured to the end of the longitudinal frame member 100 using longitudinal frame connectors 25 and 27, the first and second flanges 17 and 18 define both the proximal transverse channel 205 for receiving transverse frame member 200, and the distal transverse channel 305 for receiving transverse frame member 300, so that either first transverse frame member 200 or second transverse frame member 300 can be removably secured to the connector blocks 10a,b using the transverse frame connectors 35.

Preferably, the first and second transverse frame members 200, 300 have the same cross-sectional shape. More preferably, the cross-sectional shape is a square shape. Furthermore, the cross-sectional area of the second transverse frame member 300 is preferably greater than the cross-sectional area of the first transverse frame member 200. More preferably, the first transverse frame member 200 is 40 mm square tubing, and the second transverse frame member 300 is 50 mm square tubing. The frame members 100, 200, and 300 are preferably made from square metal tubing cut to a desired length. While the proximal transverse channel is shown as receiving a transverse frame member having a smaller cross sectional area than the transverse frame member received in the a distal transverse channel, in alternative embodiments the transverse frame member received in the proximal transverse channel may have a larger cross sectional area than the transverse frame member received in the distal transverse channel.

Also, in the embodiment shown in FIGS. 2A, 3A, and 3B, a centerline of the longitudinal frame member 100 and a horizontal centerline of the secured transverse frame member (200 or 300) are co-planar, and the outer surface of connector block 10*a* is parallel to the plane formed by the centerlines of the secured frame members—regardless of the relative cross sectional shapes or cross sectional areas of the secured frame members—so that the plane of the worksurface 400 when assembled is parallel to (i.e. a fixed distance from) the centerlines of the secured frame members. Such an arrangement facilitates the assembly of a worksurface support structure comprising frame members of different sizes and shapes.

Figure 6:
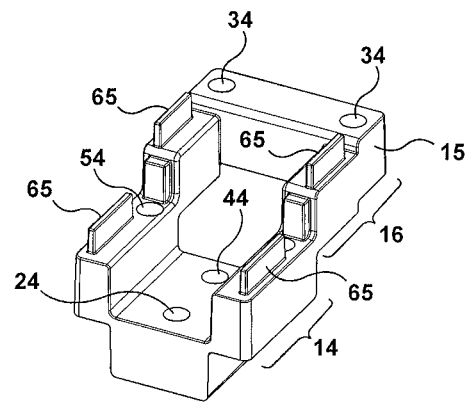
FIG. 6 is a perspective view showing a furniture connector spacer block according to an embodiment of the present invention.

Turning to FIG. 6, one or more spacer blocks 15 may be provided as part of the furniture connector 10. Spacer block 15 has accessory bores 54 located to align with the accessory bores 50 of the connector blocks 10*a*, 10*b*. Spacer block 15 also has a longitudinal connector bore 24 located to align with longitudinal frame connector bore 20*a* (shown in FIG. 1) of the connector blocks 10*a*, 10*b*, a worksurface connector bore 44 located to align with the worksurface bore 40 (shown in FIG. 1) of the connector blocks 10*a*, 10*b*, and transverse connector bores 34 located to align with the transverse frame connector bores 30 (shown in FIG. 1) of the connector blocks 10*a*, 10*b*.

Preferably, one or more projections 65 extend from one side of the spacer block 15 and are positioned to engage complementary recesses 60 (shown on block 10*b* in FIG. 1) located on connector blocks 10*a*, 10*b*. Similar recesses (not visible in FIG. 6) are preferably also located on an opposing side of each spacer block 15 to permit the secure stacking and alignment of several spacer blocks 15 during assembly of the worksurface support frame. For example, as shown in FIG. 8, projections 65 on spacer block 15*a* may be received within recesses 60 on the underside of connector block 10*a*, and projections 65 on spacer block 15*b* may be received by recesses (not visible in FIG. 6) on the underside of spacer block 15*a*.

Figure 7:
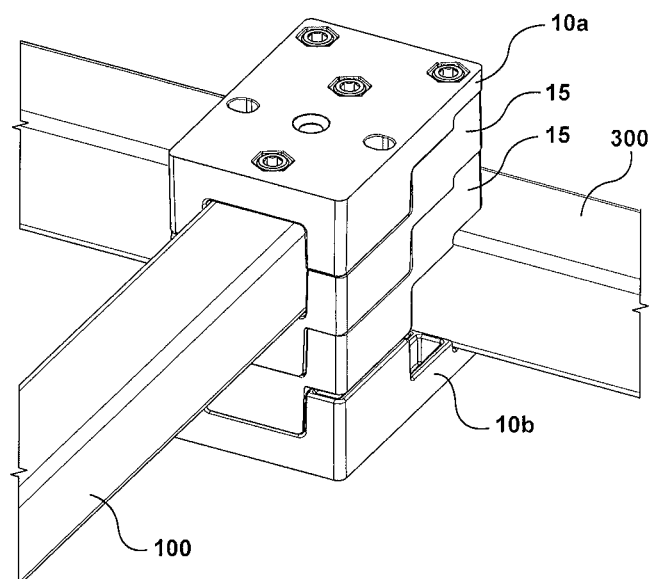
FIG. 7 is a perspective view showing a furniture connector and furniture connector spacer blocks according to an embodiment of the present invention secured to a longitudinal frame member and a second transverse frame member.
Figure 8:
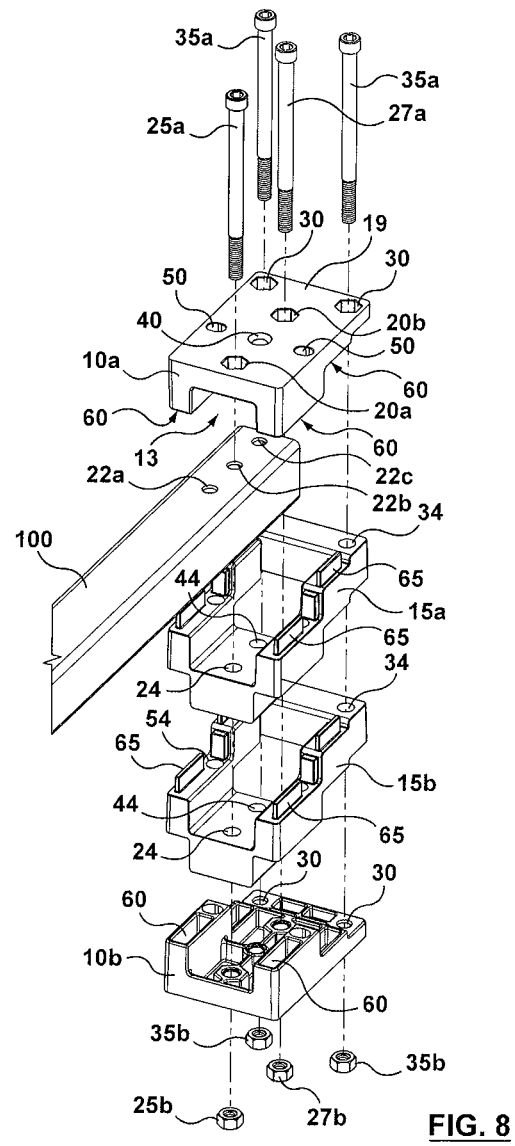
FIG. 8 is an exploded perspective view showing the furniture connector and spacer blocks of FIG. 7.

As shown in FIGS. 7 and 8, when assembled a first end 14 of spacer block 15 is received between the end of the longitudinal frame member 100 and the recess 13 defined in one of the connector blocks 10*a*, 10*b*, and a second end 16 of spacer block 15 is received between the secured transverse frame member 200, 300 and the other connector block 10*a*, 10*b*.

By using one or more spacer blocks 15, a distance between the top surface 19 of the upper connector block 10*a* and the centerline of the first and second transverse frame members 200, 300 can be incrementally adjusted. Preferably, each additional spacer block used in connector 10 provides an additional 1" increase in this distance. This may provide a convenient means for adjusting the relative height of different worksurfaces supported on the work surface support frame.

Figure 9:
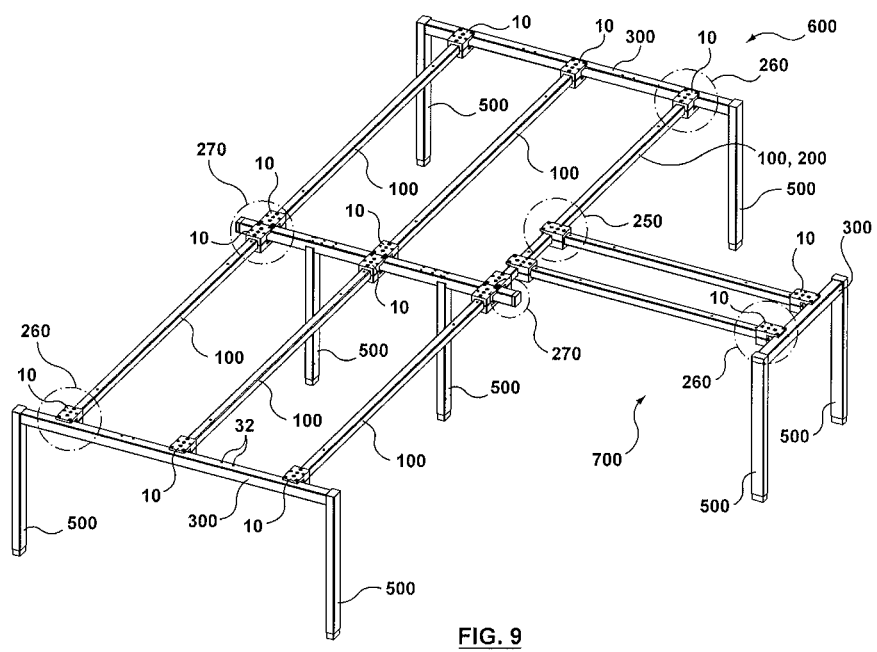
FIG. 9 is a perspective view of a work surface support frame assembled using a number of frame members secured using the furniture connector of FIG. 1.

As shown in FIG. 9, a number of connectors 10 may be used to assemble a work surface support frame from a number of the frame members 100, 200, 300. At connection 250, the furniture connector 10 may be used to secure one first longitudinal frame member 100 to one first transverse frame member 200. At connections 260 and 270, that same first transverse frame member 200 of connection 250 serves as a longitudinal frame member. Worksurface support frame 600 can also include one or more legs 500 which connect to second transverse frame members 300.

To assemble a worksurface support frame, typically one would first place a pair of connector blocks 10*a,b* about each end of at least two longitudinal frame members 100 and secure the connector blocks 10*a,b* to the longitudinal frame member 100 using longitudinal frame connectors 25 and 27 (except where longitudinal frame connector 27 is not required, e.g. as shown in FIG. 2A). As discussed above with reference to FIGS. 3A-B, the longitudinal frame connectors are inserted through longitudinal frame connector bores 20*a*, 20*b*, and those corresponding frame member bores 22*a-c* that yield a desired longitudinal distance between the secured connectors 10.

Once the at least two longitudinal frame members 100 have been fitted with connectors 10, one end of each of the at least two longitudinal frame members 100 are then secured to a second transverse frame member 300 using transverse connectors 35. As discussed above with reference to FIGS. 3A-C, the transverse frame member is placed in the distal transverse channel 305 and secured by inserting transverse frame connectors 35 through transverse connector bores 30 and corresponding transverse frame member bores 32. Another second transverse frame member 300 is then secured in the same manner to the other end of each of the at least two longitudinal frame members 100 to create a worksurface support frame. One or more legs 500 can then be connected to each of the second transverse frame members 200 to form end gables.

At this point, a worksurface 400 (shown in FIG. 2A) could be placed on the worksurface support frame and preferably secured to the connectors 10 using a number of worksurface fasteners 45 inserted through worksurface bores 40. Alternatively, additional longitudinal frame members 100 can be added to expand the worksurface frame. For example, additional longitudinal frame members 100 can be secured to one of the transverse frame members (see e.g. connection 270 in FIG. 9, where opposing connectors 10 are secured to the same transverse frame member 200) or to one of the longitudinal frame members (see e.g. connection 260 in FIG. 9) to create a wide variety of possible worksurface support frame configurations using the same connector 10.

Additionally, any number of spacer blocks 15 can be used with the connectors 10 when securing the connectors 10 to longitudinal frame members 100 when assembling a worksurface support frame, allowing a number of worksurfaces to be supported at different heights on the same worksurface support frame. Alternatively, spacer blocks 15 can be used to increase a distance between the underside of a worksurface and the transverse frame members 200 of a support frame 600 to facilitate the addition of accessory beams, cable troughs, etc. to the worksurface support frame, or simply for aesthetic purposes.

The connector of embodiments described herein facilitate the easy assembly and disassembly of furniture, and in particular may facilitate the assembly of support frames for a large number of customized configurations of worksurfaces using a relatively small number of standard parts, such as metal tubing. As shown in FIG. 9, the connectors 10 together with frame members 100, 200, 300 may be used to construct work surface support frames used to support work surfaces having a rectangular configuration or an irregular configuration with one or more peninsulas 700. The connector of embodiments described herein may also provide improved resistance to lateral, shear, moment, and compressive forces, as well as providing a pleasing aesthetic appearance.

While the above description describes features of example embodiments, it will be appreciated that some features and/or functions of the described embodiments are susceptible to modification without departing from the spirit and principles of operation of the described embodiments. For example, while longitudinal frame member 100 and transverse frame member 200, 300 are depicted as hollow frame members, persons skilled in the art will recognize that solid frame members may alternatively be used. Accordingly, what has been described above is intended to be illustrative of the claimed concept and non-limiting. It will be understood by persons skilled in the art that variations are possible and modifications may be made without departing from the scope of the invention as defined in the claims appended hereto.

The invention claimed is:
1. A furniture connector for removably securing a longitudinal frame member to one of a first transverse frame member having a first cross section and a second transverse frame member having a second cross section, the connector comprising:
   a pair of connector blocks adapted to be disposed in opposing relation,
   wherein each of the connector blocks comprises:
      a first end, wherein the first end of each connector block cooperate to removably secure an end of the longitudinal frame member between the pair of connector blocks; and
      a second end, the second end comprising a first flange and a second flange extending longitudinally;
   wherein, when the pair of connector blocks are secured to the end of the longitudinal frame member:
      the first flange of each connector block cooperate to define a proximal transverse channel adapted to removably secure the first transverse frame member to the pair of connector blocks, and
      the second flange of each connector block cooperate to define a distal transverse channel adapted to removably secure the second transverse frame member to the pair of connector blocks.
2. The furniture connector of claim 1 in combination with the first transverse frame member and the second transverse frame member, wherein the first cross section and the second cross section have substantially the same shape, and the second cross section has a greater cross-sectional area than the first cross section.
3. The furniture connector of claim 2, wherein the first cross section and the second cross section have a rectangular shape.
4. The furniture connector of claim 1 in combination with the longitudinal frame member, wherein an end of the longitudinal frame member has a longitudinal frame member cross section, and wherein the longitudinal frame member cross section and the first cross section have substantially the same shape.
5. The furniture connector of claim 1, wherein the first flange extends longitudinally from the first end, and wherein the second flange extends longitudinally from a distal end of the first flange.
6. The furniture connector of claim 5, wherein the first flange has a greater thickness than the second flange.
7. The furniture connector of claim 5, further comprising a transverse connector, wherein a transverse connector bore extends through each second flange, the transverse connector being adapted to pass through the transverse connector bore of each second flange to removably secure one of the first and second frame members between the pair of connector blocks.
8. The furniture connector of claim 7, wherein:
   when the second transverse frame member is removably secured in the distal transverse channel the transverse connector passes through a corresponding frame member bore defined in the second transverse frame member.
9. The furniture connector of claim 7, wherein the transverse connector comprises a transverse frame connector bolt and a transverse frame connector nut, and wherein a region of each transverse connector bore is adapted to receive the transverse frame connector nut and to resist rotational movement thereof.

10. The furniture connector of claim 1, wherein the distal transverse channel has a greater width than the proximal transverse channel.
11. The furniture connector of claim 1, wherein when the pair of connector blocks are secured to the longitudinal frame member and to one of the first or second transverse frame member, a centerline of the longitudinal frame member and a centerline of the one of the first and second transverse frame members are coplanar.
12. The furniture connector of claim 1 in combination with the longitudinal frame member, wherein an end of the longitudinal frame member is adapted to adjustably connect to the pair of connector blocks in a shortened position and a lengthened position, wherein the longitudinal frame member is removably securable to the pair of connector blocks by a longitudinal frame connector.
13. The furniture connector of claim 12, wherein a longitudinal frame connector bore extends transversely through a first end of each connector block, the longitudinal frame connector bore of each connector block is adapted to receive the longitudinal frame connector.
14. The furniture connector of claim 13, wherein the longitudinal frame connector comprises a longitudinal frame connector bolt and a longitudinal frame connector nut, and wherein a region of each longitudinal connector bore is adapted to receive the longitudinal frame connector nut and to resist rotational movement thereof.
15. The furniture connector of claim 1, further comprising a spacer block insertable between the pair of connector blocks.
16. The furniture connector of claim 15, wherein a first end of the spacer block is adapted to be received between the end of the longitudinal frame member and a recess defined in one of the pair of connector blocks, wherein a second end of the spacer block is adapted to be received between the secured transverse frame member and the other connector block.
17. The furniture connector of claim 1, wherein each connector block comprises a worksurface bore extending therethrough, wherein the worksurface bore is adapted to receive a worksurface fastener therethrough for removably securing a worksurface to the furniture connector.
18. The furniture connector of claim 1, wherein each connector block comprises an accessory bore extending therethrough, wherein the accessory bore is adapted to receive an accessory fastener therethrough for removably securing an accessory beam to the furniture connector.
19. A furniture piece comprising:
   a worksurface
   a support frame adapted to support the worksurface, the support frame comprising:
      a longitudinal frame member;
      one of a first transverse frame member having a first cross section and a second transverse frame member having a second cross section;
      a pair of connector blocks adapted to be disposed in opposing relation,
      wherein each of the connector blocks comprises:
         a first end, wherein the first end of each connector block cooperate to removably secure an end of the longitudinal frame member between the pair of connector blocks; and
         a second end, the second end comprising a first flange and a second flange extending longitudinally;
      wherein, when the pair of connector blocks are secured to the end of the longitudinal frame member:
         the first flange of each connector block cooperate to define a proximal transverse channel adapted to removably secure the first transverse frame member to the pair of connector blocks, the second flange of each connector block cooperate to define a distal transverse channel adapted to removably secure the second transverse frame member to the pair of connector blocks; and an outer face of one of the pair of connector blocks is adapted to abut against an underside of the worksurface to support the worksurface thereon.

20. A table for resting on a floor surface, the table comprising:

a worksurface;

a support frame adapted to support the worksurface;

a plurality of legs adapted to stand of the floor surface and to support the support frame;

wherein the support frame comprises:

a longitudinal frame member;

one of a first transverse frame member having a first cross section and a second transverse frame member having a second cross section;

a pair of connector blocks adapted to be disposed in opposing relation, wherein each of the connector blocks comprises:

a first end, wherein the first end of each connector block cooperate to removably secure an end of the longitudinal frame member between the pair of connector blocks; and a second end, the second end comprising a first flange and a second flange extending longitudinally;

wherein, when the pair of connector blocks are secured to the end of the longitudinal frame member:

the first flange of each connector block cooperate to define a proximal transverse channel adapted to removably secure a first transverse frame member having a first cross section to the pair of connector blocks, the second flange of each connector block cooperate to define a distal transverse channel adapted to removably secure the second transverse frame member to the pair of connector blocks; and an outer face of one of the pair of connector blocks is adapted to abut against an underside of the worksurface to support the worksurface thereon.

\* \* \* \* \*